United States Patent
Hayes et al.

(10) Patent No.: US 11,250,422 B1
(45) Date of Patent: Feb. 15, 2022

(54) ENHANCED MOBILE WALLET PAYMENT ELEMENTS

(71) Applicant: Wells Fargo Bank, N.A., San Francisco, CA (US)

(72) Inventors: Thomas Hayes, Katy, TX (US); Joon Maeng, Newcastle, WA (US); Ramanathan Ramanathan, Bellevue, WA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 522 days.

(21) Appl. No.: 15/394,656

(22) Filed: Dec. 29, 2016

(51) Int. Cl.
| | |
|---|---|
| *G06Q 20/10* | (2012.01) |
| *G06Q 20/38* | (2012.01) |
| *G06Q 20/36* | (2012.01) |
| *G06Q 20/32* | (2012.01) |
| *G06F 3/0484* | (2013.01) |

(52) U.S. Cl.
CPC ......... *G06Q 20/3829* (2013.01); *G06Q 20/10* (2013.01); *G06Q 20/36* (2013.01); *G06F 3/04842* (2013.01); *G06Q 20/3278* (2013.01)

(58) Field of Classification Search
CPC .............. G06Q 20/10; G06Q 20/3829; G06Q 20/3278; G06Q 20/36; G06Q 20/367; G06Q 20/405; G06F 3/04842
See application file for complete search history.

(56) References Cited

U.S. PATENT DOCUMENTS

| | | | |
|---|---|---|---|
| 8,935,802 B1 * | 1/2015 | Mattsson | G06F 21/6245 |
| | | | 726/26 |
| 9,727,859 B1 * | 8/2017 | Toewe | G06Q 20/202 |
| 9,881,298 B2 * | 1/2018 | Flitcroft | G06Q 20/00 |
| 10,037,526 B2 * | 7/2018 | Campos | G06Q 20/3674 |
| 10,057,225 B1 | 8/2018 | Hayes et al. | |
| 10,075,300 B1 | 9/2018 | Maeng et al. | |
| 2008/0128515 A1 * | 6/2008 | Di Iorio | G06Q 20/35765 |
| | | | 235/492 |

(Continued)

OTHER PUBLICATIONS

"EMV® Contactless Specifications for Payment Systems—Book A", EMVCO—Architecture and General Requirements—Version 2.7, (Apr. 2018), 116 pgs.

(Continued)

*Primary Examiner* — Neha Patel
*Assistant Examiner* — Chunling Ding
(74) *Attorney, Agent, or Firm* — Schwegman Lundberg & Woessner, P.A.

(57) ABSTRACT

Disclosed in some examples are methods, systems, and machine readable mediums which provide a store credit issued electronically to a mobile wallet application from a merchant. This credit may be issued to a mobile wallet in the form of an enhanced wallet payment element. This enhanced wallet payment element may include the terms and conditions (e.g., repayment terms) of the credit (e.g., a digital/smart contract). The customer may accept or reject these terms. For example, when the customer accepts the terms, the enhanced wallet payment element digitally signs the agreement and indicates acceptance to the merchant mobile wallet system (e.g., sends the digital signature to the merchant). Once accepted, the enhanced wallet payment element may be utilized to pay for goods or services subject to the terms and conditions.

18 Claims, 11 Drawing Sheets

(56) References Cited

U.S. PATENT DOCUMENTS

| | | | | |
|---|---|---|---|---|
| 2012/0088487 | A1* | 4/2012 | Khan | G06Q 20/322 |
| | | | | 455/418 |
| 2013/0339166 | A1* | 12/2013 | Baer | G06Q 20/405 |
| | | | | 705/16 |
| 2014/0006277 | A1* | 1/2014 | Rao | G06Q 20/4012 |
| | | | | 705/41 |
| 2015/0026049 | A1* | 1/2015 | Theurer | G06Q 20/405 |
| | | | | 705/41 |
| 2015/0278843 | A1 | 10/2015 | Lawe et al. | |
| 2015/0339656 | A1* | 11/2015 | Wilson | G06Q 20/40 |
| | | | | 705/44 |
| 2016/0055583 | A1* | 2/2016 | Liberty | G06Q 40/02 |
| | | | | 705/37 |
| 2016/0092870 | A1* | 3/2016 | Salama | G06Q 20/3226 |
| | | | | 705/71 |
| 2016/0358172 | A1* | 12/2016 | Ziat | G06Q 20/3227 |
| 2017/0046679 | A1* | 2/2017 | Gotlieb | G06K 19/06206 |
| 2017/0236143 | A1* | 8/2017 | Code | G06Q 20/387 |
| | | | | 705/14.27 |
| 2018/0075453 | A1* | 3/2018 | Durvasula | G06Q 20/4016 |
| 2018/0136792 | A1* | 5/2018 | Esposito | G06F 3/04817 |

OTHER PUBLICATIONS

"EMV® Contactless Specifications for Payment Systems—Book B", EMVCO—Entry Point Specification—Version 2.7, (Apr. 2018), 52 pgs.

"EMV® Contactless Specifications for Payment Systems—Book C-2", EMVCO—Kernel 2 Specification—Version 2.7, (Apr. 2018), 578 pgs.

"EMV® Contactless Specifications for Payment Systems—Book C-3", EMVCO—Kernel 3 Specification—Version 2.7, (Apr. 2018), 153 pgs.

"EMV® Contactless Specifications for Payment Systems—Book C-4", EMVCO—Kernel 4 Specification—Version 2.7, (Apr. 2018), 173 pgs.

"EMV® Contactless Specifications for Payment Systems—Book C-5", EMVCO—Kernel 5 Specification—Version 2.7, (Apr. 2018), 132 pgs.

"EMV® Contactless Specifications for Payment Systems—Book C-6", EMVCO—Kernel 6 Specification—Version 2.7, (Apr. 2018), 125 pgs.

"EMV® Contactless Specifications for Payment Systems—Book C-7", EMVCO—Kernel 7 Specification—Version 2.7, (Apr. 2018), 73 pgs.

"EMV® Contactless Specifications for Payment Systems—Book D", EMV Contactless Communication Protocol Specification—Version 2.6, (Mar. 2016), 249 pgs.

* cited by examiner

ENHANCED MOBILE WALLET PAYMENT ELEMENTS

TECHNICAL FIELD

Embodiments pertain to mobile (digital) wallets. Some embodiments relate to enhanced mobile wallet payment elements that are executable modules that provide functionality to enhance the mobile wallet application.

BACKGROUND

Small or mid-size retail merchants often provide their customers merchandise on contract, such as big ticket items like refrigerators, washing machines, furniture, and the like. Contract services are often provided to customers the merchants believes they can trust. These contract services provide a way to stay competitive with larger retail merchants. Larger outfits, e.g. a Wal-Mart or Target, are not going to provide these types of services as the risk and administrative costs outweigh the benefits. The contract services small merchants provide are typically to people who most likely couldn't get credit elsewhere. This is a staple of small retail merchants that provide typical home and auto services.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
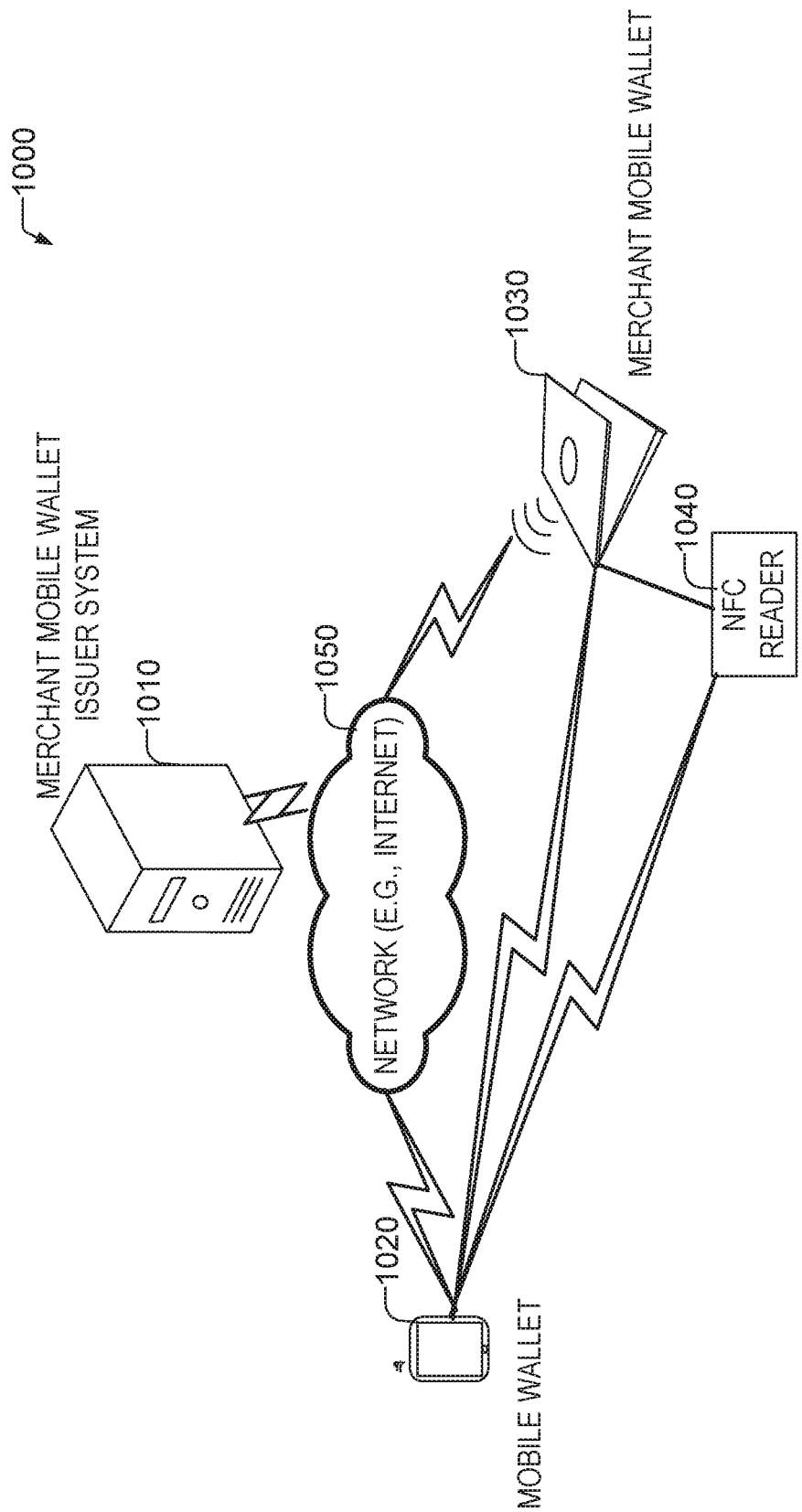
FIG. 1 shows a diagram of an enhanced mobile wallet payment element and mobile wallet environment according to some examples of the present disclosure.

Contract services are time consuming from a records management perspective, are often not automated, and usually are directed to specific products. An example would be if someone came into Hayes General Store looking to put on contract a washer and dryer set for $850.00. The merchant then draws up a contract, e.g. for 60, 90, 120 day payment, itemizes the contract to reflect the sale and includes relevant tax and interest rates. The merchant then must maintain these records, monitor the records for monthly billing cycles, and in response to failure of the customer to pay, actively collect the payment.

A more efficient approach would be to use an in-store line of credit wherein instead of drafting up a contract for each customer purchase, e.g. $850.00 for the washer and dryer, the merchant could give the customer $1000.00 of in store credit in the form of an in-store credit card. The customer could get the washer and dryer and would have an additional $150.00 to spend in the merchant's store. The merchant would still have to do collection but wouldn't have to keep up with all the contracts.

Disclosed in some examples are methods, systems, and machine readable mediums which provide a store credit issued electronically to a mobile wallet application from a merchant. This credit may be issued to a mobile wallet in the form of an enhanced mobile wallet payment element (EMWPE). For example, a merchant may offer credit to a particular customer in the form of EMWPE sent to a customer's mobile computer device. This EMWPE may include, and enforce, the terms and conditions (e.g., repayment terms) of the credit (e.g., a digital/smart contract). The customer may accept or reject these terms. If the customer accepts the terms, the EMWPE may digitally sign the agreement and send a digitally signed copy to the merchant mobile wallet system (e.g., sends the digital signature to the merchant). Once accepted, the enhanced wallet payment element may be utilized to pay for goods or services subject to the terms and conditions. Additionally, the EMWPE may enforce the terms and conditions. For example, by prompting the user to make timely payments, enforcing credit limits, enforcing usage conditions (e.g., only allowing use at the merchant) and the like. In some examples, the enhanced payment element can connect with other payment elements (e.g., a pay stub element, checking account element) and collect the loan amount and interest automatically in regular installments or in full as per the agreed terms and conditions. In some cases, the EMWPE may limit the use within a geographic boundary (e.g., in the US only), specify frequency of use (e.g., single use), and/or impose other usage conditions. The EMWPE may be renewable with additional fund or revised with different terms and conditions.

As will be explained later, the EMWPE may be a module for the mobile wallet application (e.g., similar to a plug-in for a browser) that may be customized for the merchant and may extend the functionality of the mobile wallet applications. While described herein in the context of providing merchant credit, it will be appreciated by one of ordinary skill in the art with the benefit of the present disclosure that EMWPEs may be utilized to extend mobile wallet functionality in a number of other ways. Additionally, as is described herein, the EMWPE solves problems of merchant credit of: 1.) providing and executing a legally binding contract by utilizing built-in terms and conditions and digital signatures signifying acceptance. 2.) Enforcing terms and conditions by including digital logic that automatically restricts what the digital credit can be utilized for and by providing payment reminders. 3.) Providing automated book-keeping in the merchant side by utilizing mobile wallet elements to track and manage extended credit. These problems are solved using technical computer based solutions that improve the functioning of the computer systems by adding customizable modules to the traditional mobile wallet applications that enhance the mobile wallet functionality.

A mobile wallet (also known as an electronic or digital wallet) refers to an application program executed by one or more computing devices (e.g., mobile devices such as a smartphone) and corresponding device memory which store and manage digital representations of elements (or items) typically found in a user's wallet or purse. These elements may comprise payment elements and non-payment elements. Payment elements are items which may be used in a financial transaction. Example payment elements managed by the digital wallet include digital representations of transaction cards, financial information, discount coupons, gift cards, subway passes, movie tickets, and so on. Example non-payment elements include digital representations of driver's licenses, passports, student IDs, library cards, membership cards, insurance cards, and so on. The mobile wallet application allows an individual to use the stored information to pay for items (either in person or in e-commerce transactions), provide for identification (e.g., producing a driver's license), transfer money to others, access bank accounts, collect discount coupons, submit subway passes, and the like. As another example, a mobile wallet may be used to verify the age of a buyer while purchasing alcohol. Exemplary mobile wallets include but are not limited to APPLE PAY®, ANDROID PAY®, GOOGLE WALLET®, CURRENT C® by MCX®, SAMSUNG PAY®, and peer-to-peer payment apps such as VENMO®, SQUARE CASH®, and TILT APP®.

Communications between mobile wallets may be accomplished using both Peer-to-Peer modes and infrastructure modes. Wallet to wallet communications using network-based infrastructures is disclosed in U.S. application Ser. No. 15/264,531 filed on Sep. 13, 2016 and titled "Secure Digital Communications," the entirety of which is incorporated herein by reference. Peer to Peer based wallet communications are described in U.S. application Ser. No. 15/394,526 filed on Dec. 29, 2016 and titled "Wireless Peer to Peer Mobile Wallet Connections," the entirety of which is incorporated herein by reference.

Turning now to FIG. 1 a diagram of an enhanced payment element and mobile wallet environment 1000 is shown according to some examples of the present disclosure. Mobile wallet application 1020 (executing on a computing device) may communicate with the merchant mobile wallet application 1030. For example, over one or more peer to peer links. In other examples, the mobile wallet application 1020 may communicate with the merchant mobile wallet application 1030 over computer network 1050 (e.g., infrastructure mode). Additionally, the mobile wallet application 1020 may communicate using short range NEC communications to a NEC reader device 1040 communicatively coupled or integral with the merchant mobile wallet application 1030. For example, to make a payment, the mobile wallet application 1020 may be programmed to communicate with the NEC reader device 1040. Mobile wallet application 1020 and/or merchant mobile wallet application 1030 may communicate with the merchant mobile wallet issuer system 1010 over computer network 1050. In some examples, merchant mobile wallet issuer system 1010 may assist in provisioning and facilitating the creation of the enhanced payment elements. The merchant mobile wallet issuer system 1010 may be managed by a merchant or a bank or a trusted third party such as a credit card company which has a partnership with the merchant.

Figure 2:
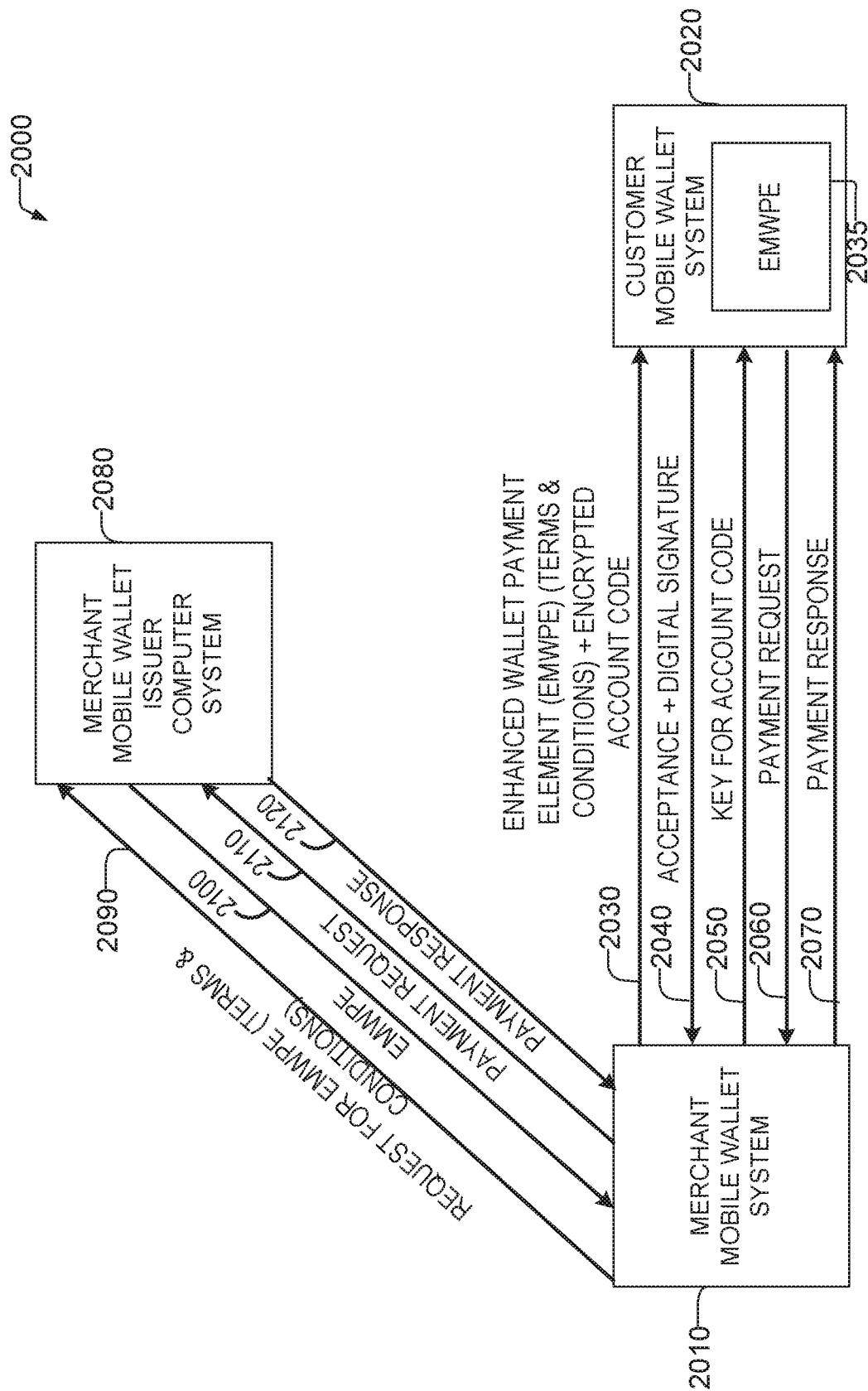
FIG. 2 shows a diagram of an enhanced wallet payment element (EMWPE) issuance and usage flow according to some examples of the present disclosure.

FIG. 2 shows a diagram of an EMWPE issuance and usage flow 2000 according to some examples of the present disclosure. In some examples, prior to the flow 2000, the merchant may have verified the customer's credit or engaged in preliminary negotiations. Merchant mobile wallet application 2010 may send an EMWPE with certain terms and conditions 2030 to the customer's mobile wallet system (e.g., through wallet-to-wallet communications). This EMWPE contains an application (e.g., a plug in for the mobile wallet application), data describing the terms and conditions, and certain protected information (e.g., account numbers or codes) that is encrypted by a key kept secret by the merchant mobile wallet application 2010. The customer mobile wallet application 2020 may store and execute the EMWPE 2035 (e.g., by executing the EMWPE within its own application framework), which may allow the user to apply for the credit (e.g., by creating a graphical user interface (GUI) that allows the user to input user information), present the terms and conditions to the user of the customer mobile wallet application 2020 (e.g., in GUI), and the like. The user may input their information and accept or decline or edit the terms and conditions. If the user declines the EMWPE may delete itself from the customer mobile wallet system. If the user accepts, the EMWPE and the customer mobile wallet system may sign a digital acceptance with the private key of the customer's mobile wallet application 2020 and send the acceptance (along with the user information) back with the digital signature in the acceptance message 2040.

Once the merchant mobile wallet application 2010 receives the acceptance, it may determine whether to approve the credit, and if the credit is approved it may send the cryptographic key 2050 for the account code to the customer mobile wallet application 2020. The customer mobile wallet system may use the cryptographic key to unlock the account code. The account code may be utilized for payments.

Upon desiring to make a purchase using the store credit represented by the EMWPE, the customer mobile wallet application 2020 may make a payment request 2060, included in the payment request may be the account code, the amount, and other information. Prior to sending a payment request, the EMWPE may verify that the payment complies with the terms and conditions. Example terms and conditions include requiring that a payment be to a particular mobile wallet (e.g., based upon the mobile wallet address), requiring that the payment be for certain goods and/or services, and requiring the payment meet certain amount thresholds (e.g., enforcing a total amount of the credit such that the user does not overspend). The merchant mobile wallet system may verify the account code, check to be sure that the payment meets the terms and conditions, and if valid, may send a payment response 2070 (accepted or rejected). The merchant mobile wallet system may then deduct an available credit amount for the user's mobile wallet system. If the payment was accepted, a balance remaining may be deducted by the EMWPE so that the customer does not overspend the allocated credit.

While in some examples, the merchant mobile wallet system may create EMWPE applications (e.g., from templates), and approve transactions, in other examples, the merchant mobile wallet system may utilize a merchant mobile wallet issuer computer system 2080 to assist in one or both of these tasks. In some examples, prior to offering the EMWPE, the merchant mobile wallet application 2010 may request an EMWPE from the merchant mobile wallet issuer computer system 2080 using message 2090. The message may include the merchant's proposed terms and conditions. Terms and conditions as used herein may be any rule set by the merchant on the use of the payment element. Terms and conditions may be in the form of one or more chained if-then rules. Examples include: if payment is to the merchant, then evaluate the next rule, where the next rule is another if-then statement. If the payment meets all the rules, then it may be allowed, otherwise it may be denied.

The merchant mobile wallet issuer computer system may utilize a pre-made EMWPE and may simply attach the terms and conditions as a resource file. In other examples, an EMWPE may be customized based upon the merchant mobile wallet system (e.g., including custom graphics for the merchant mobile wallet system, including the merchant's terms and conditions) and may be compiled on the fly (and automatically). In some examples, the customer mobile wallet application 2020 may provide an operating system and other device information such that the EMWPE may be executable directly on the customer mobile wallet system. In other examples the EMWPE may comprise interpretable instructions rather than executable instructions. In these examples, the customer's mobile wallet application 2020 may have an interpreter application that interprets the instructions to executable instructions (e.g., a JAVA® virtual machine). The EMWPE may be returned using message 2100.

In some examples, the acceptance message 2040 may include personal information (e.g., name, address, phone number, social security number) of the customer collected by the EMWPE. The merchant mobile wallet application 2010 and/or the merchant mobile wallet issuer computer system 2080 may utilize this information to determine whether to approve the customer for credit. For example the merchant mobile wallet application 2010 may determine on its own that the customer should be granted credit, and the terms and conditions of that credit. In other examples, the merchant mobile wallet application 2010 may decide to, or be required to have the approval of the merchant mobile wallet issuer computer system 2080. In this case, the customer's information may be forwarded to the merchant mobile wallet issuer computer system 2080. Merchant mobile wallet issuer computer system 2080 may utilize information about the customer and the merchant to determine whether to approve the account. For example, the merchant's credit may be a proxy for its own bank, checking, or other accounts. Thus a purchase by customer will deduct funds from the merchant. Once approved, the cryptographic key for the account code may be sent to the customer mobile wallet application 2020 and the EMWPE is usable for making purchases.

By sending the EMWPE to the customer's mobile wallet system before approval, the EMWPE may provide one or more GUIs to collect customized personal information required by the merchant prior to acceptance by the merchant and issuance of the credit. The customer may not actually use the EMWPE for payment until approval as the merchant's mobile wallet application 2010 would not allow the payment and also because the EMWPE does not have the account code (as its encrypted).

Upon a payment request, in some examples, the merchant mobile wallet application 2010 may make the decision to approve or deny the payment. In other examples, the merchant mobile wallet issuer computer system may make the determination. In these examples, the payment information may be passed to the merchant mobile wallet issuer computer system 2080 with request message 2110. The merchant mobile wallet issuer computer system 2080 may deduct the funds from the merchant's account (if necessary) and/or approve or deny the transaction. For example the response may be sent in message 2120.

Figure 3:
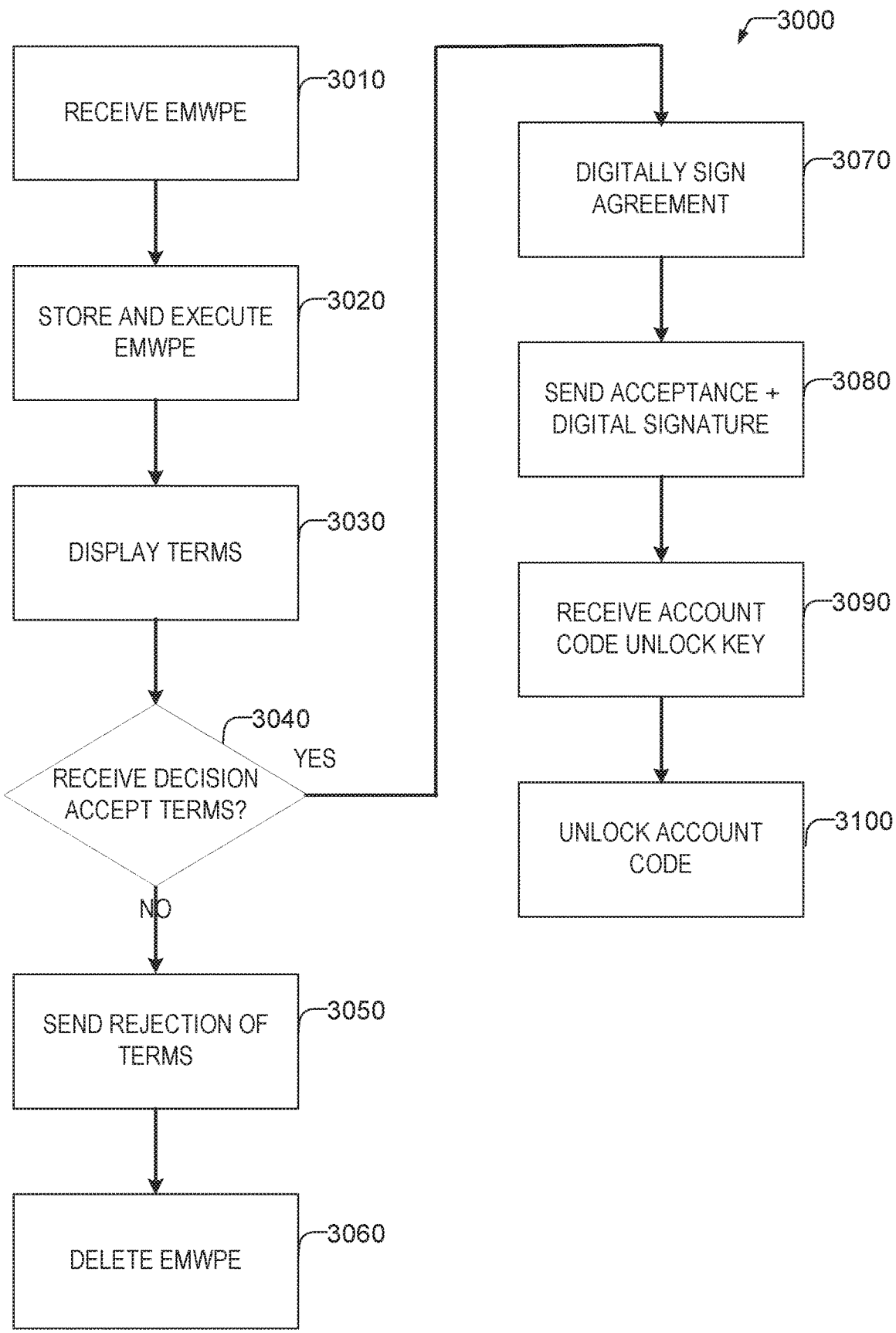
FIG. 3 shows a flowchart of a method of a customer mobile wallet application receiving an EMWPE according to some examples of the present disclosure.

FIG. 3 shows a flowchart of a method 3000 of a customer mobile wallet application receiving an EMWPE. At operation 3010 the EMWPE may be received. For example, using mobile wallet to mobile wallet communications. As noted above, the customer may provide personal information used to approve the credit at many points during this process. For example, prior to operation 3010 the customer may have sent application information (e.g., the user's name, social security number, address, and the like). In some examples, and as will be described, the customer information may be collected through the EMWPE. At operation 3020 the mobile wallet application stores and executes the EMWPE. At operation 3030 the EMWPE displays the terms and conditions. In some examples, the EMWPE also displays one or more GUIs that collect personal information used to approve or deny the customer credit. At operation 3040 the EMWPE may receive the user's agreement or disagreement with the terms and conditions and optionally, the customer's personal information. If the user did not accept the terms and conditions, the EMWPE may send a rejection notice to the merchant mobile wallet application at operation 3050. The EMWPE may then be deleted from the user's computing device at operation 3060.

At operation 3070 if the user agreed to the terms and conditions the agreement (or some identifier of the agreement such as a unique code representing the agreement) may be digitally signed by the EMWPE using the private key of the mobile wallet application. This legally binds the user to the terms of the agreement. At operation 3080 a notification of acceptance along with the digital signature (and optionally the customer's personal information) may be forwarded to the merchant. If the merchant is satisfied with the information received, the merchant's mobile wallet application may then send, and the EMWPE may receive the key to unlock the account code at operation 3090. The EMWPE may then use the key to unlock the account code 3100. The EMWPE may now be used for payments.

Figure 4:
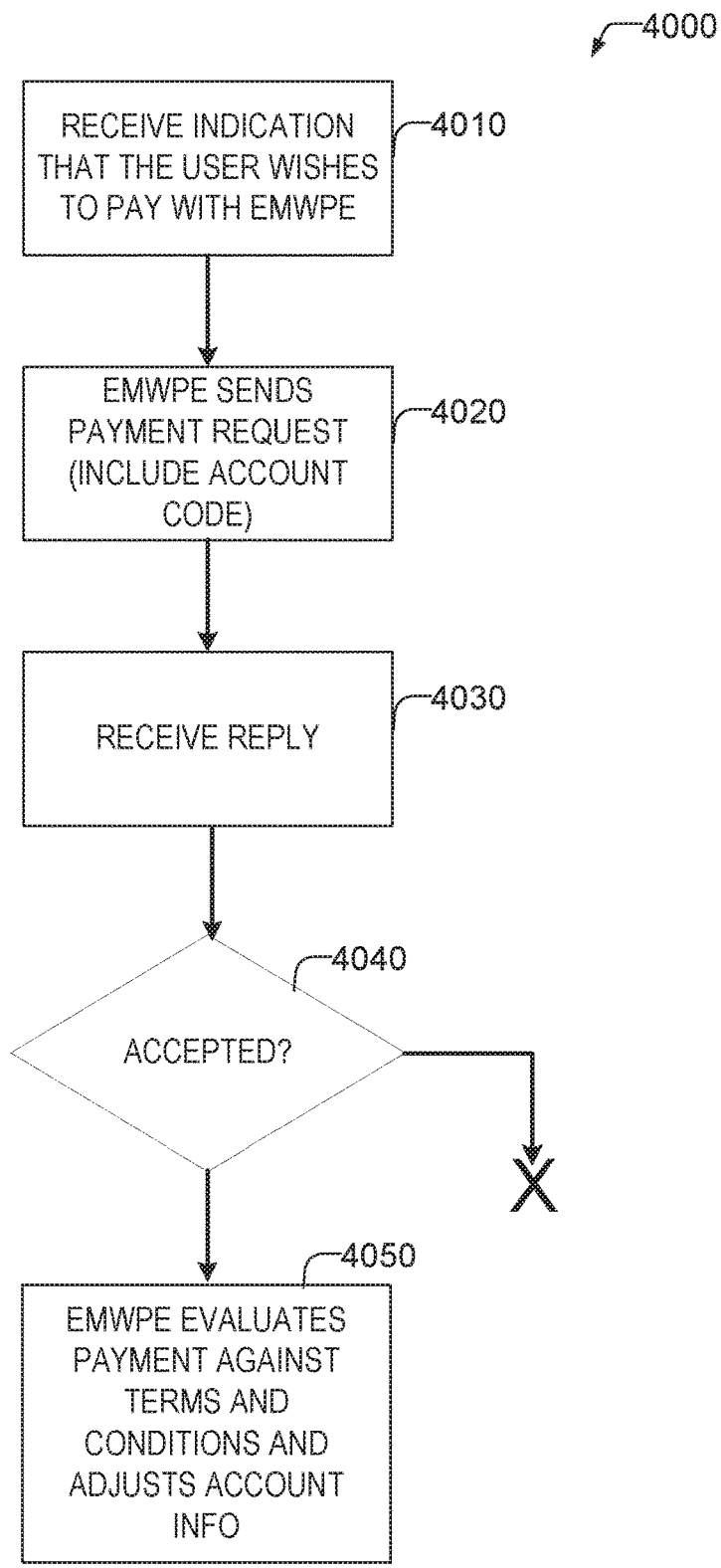
FIG. 4 shows a flowchart of an example method of a mobile wallet application utilizing an EMWPE to pay for a transaction according to some examples of the present disclosure.

FIG. 4 shows a flowchart of an example method 4000 of a mobile wallet application utilizing an EMWPE to pay for a transaction according to some examples of the present disclosure. At operation 4010 the mobile wallet application receives a selection indicating that the user wants to pay for a transaction using an EMWPE payment element. For example, the user may utilize a GUI to select from a list of payment elements. At operation 4020, the EMWPE may validate that the transaction meets the terms and conditions of the contract and if so, sends a payment request including the account code using Mobile Wallet to Mobile Wallet communications to the merchant mobile wallet application. At operation 4030 the EMWPE receives the reply from the merchant mobile wallet application. At operation 4040 a determination is made whether the payment was accepted based upon the contents of the reply. If the payment was denied the user may be notified and processing ends. If the payment was accepted at operation 4050 the EMWPE may evaluate the payment against the terms and conditions—e.g., reduce an available credit, or the like. The user may also be notified of the acceptance of the payment.

Figure 5:
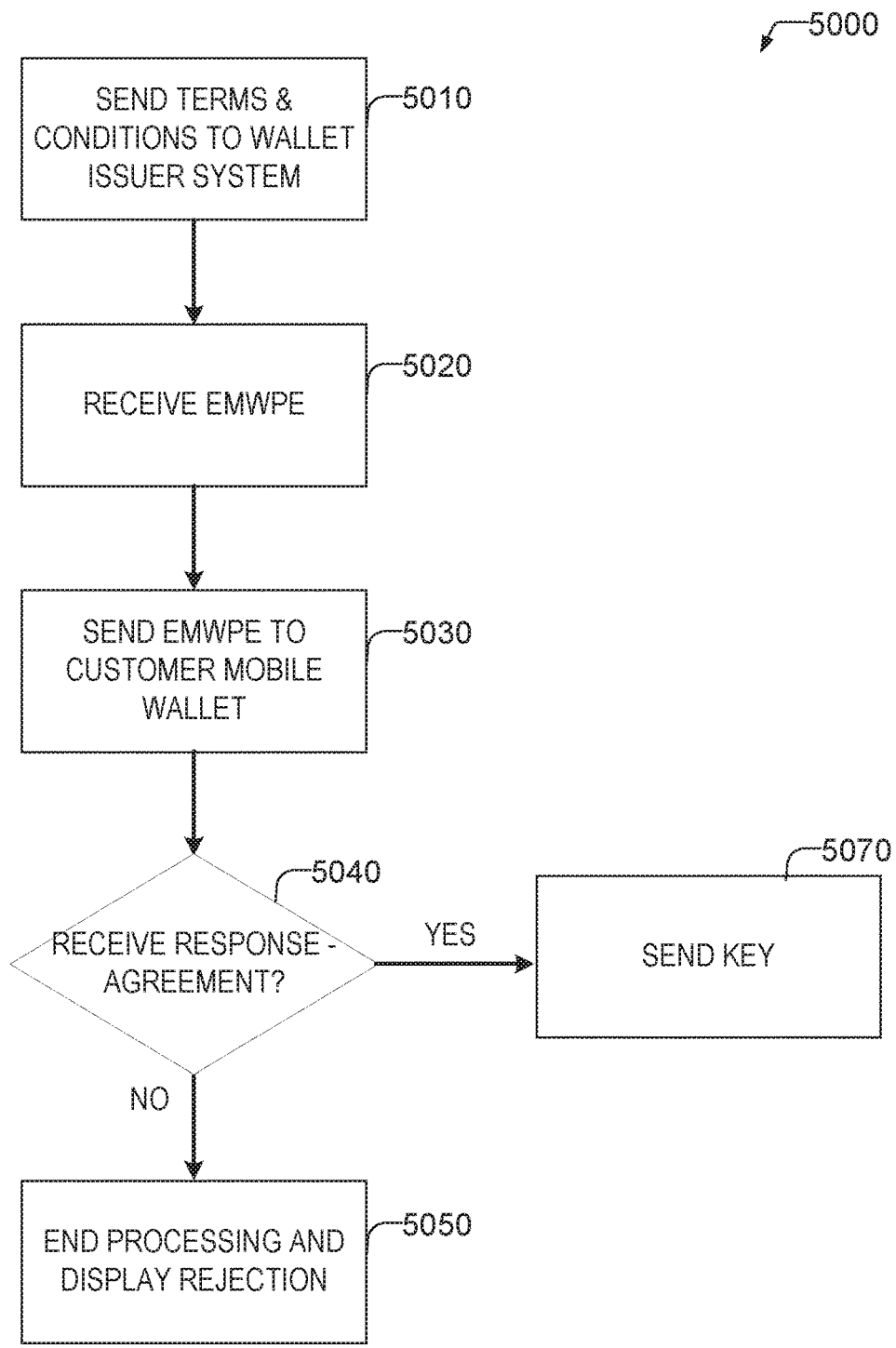
FIG. 5 shows a flowchart of a method of a merchant mobile wallet application issuing an EMWPE according to some examples of the present disclosure.

FIG. 5 shows a flowchart of an example method 5000 of a merchant mobile wallet application issuing an EMWPE according to some examples of the present disclosure. Operations 5010 and 5020 are performed if the mobile wallet issuer system is involved in provisioning the EMWPE. In operation 5010, the merchant mobile wallet application sends the terms and conditions to the wallet issuer system. At operation 5020 the merchant mobile wallet application receives the EMWPE (if everything is approved). At operation 5030 the merchant mobile wallet application may send the EMWPE to the customer mobile wallet. At operation 5040 a response is received and a determination is made as to whether the customer has agreed to the terms and whether the information provided by the customer is acceptable. If the customer has not agreed, or the information is not acceptable (e.g., their credit is not acceptable) at operation 5050, processing may be terminated and a rejection displayed on a GUI display of the merchant mobile wallet application. Note that the process for determining if the information provided by the customer is acceptable may involve contacting credit agencies, or other financial providers. If the customer has agreed, and the information is acceptable, at operation 5070 the key to unlock the account code or number is sent to the customer's mobile wallet application.

Figure 6:
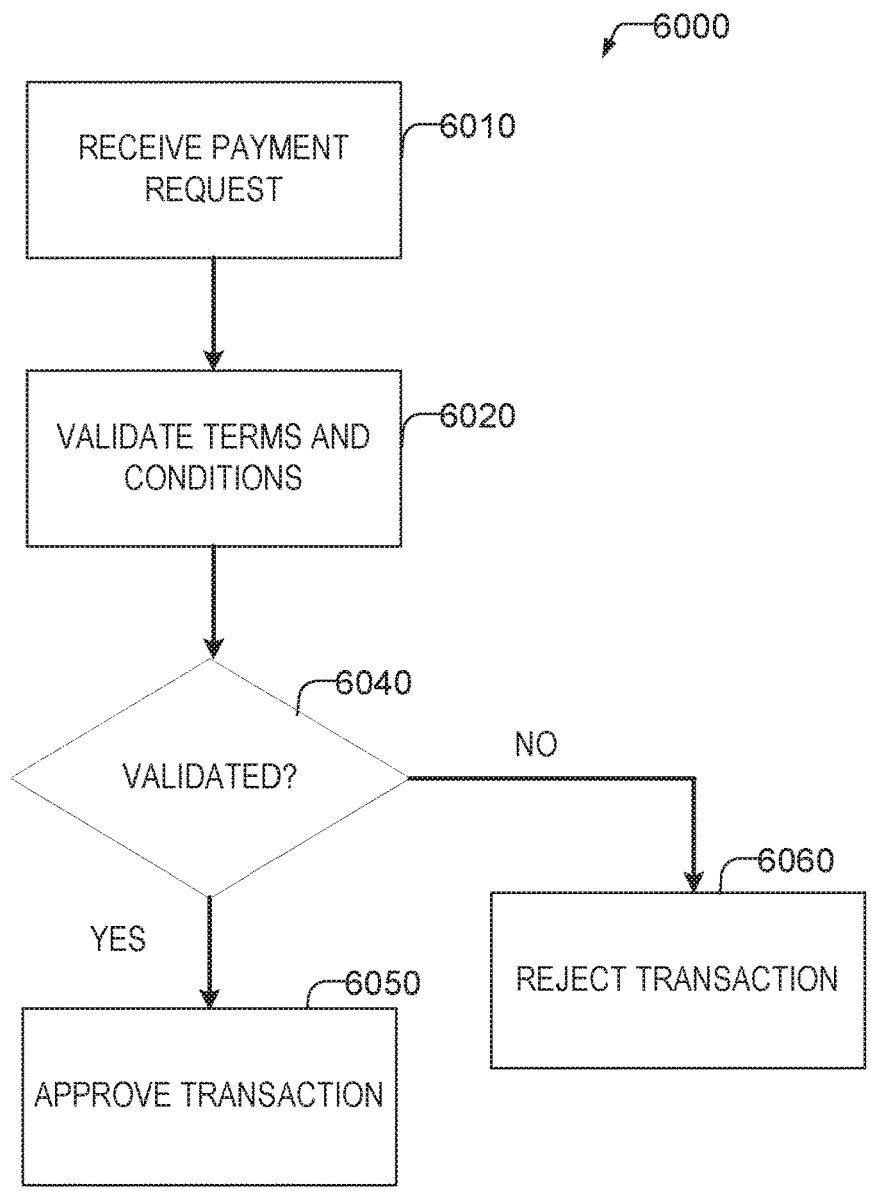
FIG. 6 shows a flowchart of a method of a merchant mobile wallet application receiving a transaction request for an EMWPE payment element according to some examples of the present disclosure.

FIG. 6 shows a flowchart of a method 6000 of a merchant mobile wallet application receiving a transaction request for an EMWPE payment element according to some examples of the present disclosure. At operation 6010 the payment request is received. This request may include a payment amount and a account code (e.g., an account number). At operation 6020 the terms and conditions are validated against the payment request. For example, a determination is made as to whether the account code is valid and the user has enough available credit for the transaction, whether the EMWPE is valid for this merchant, or the like. At operation 6040 a determination is made as to whether the terms and conditions were validated. If the payment meets the terms and conditions, then the transaction may be approved at operation 6050 otherwise at operation 6060 the transaction may be rejected. As noted, in some examples, the mobile wallet issuer system may approve or reject the transaction. In these examples, the merchant mobile wallet may send the transaction to the mobile wallet issuer system for approval or rejection. In some examples, approval of the transaction comprises a message to a POS terminal or a display of a message stating that the transaction is approved. In other examples, it may trigger a payment from a merchant's financial account on behalf of the customer via a message to the mobile wallet issuer system.

Figure 7:
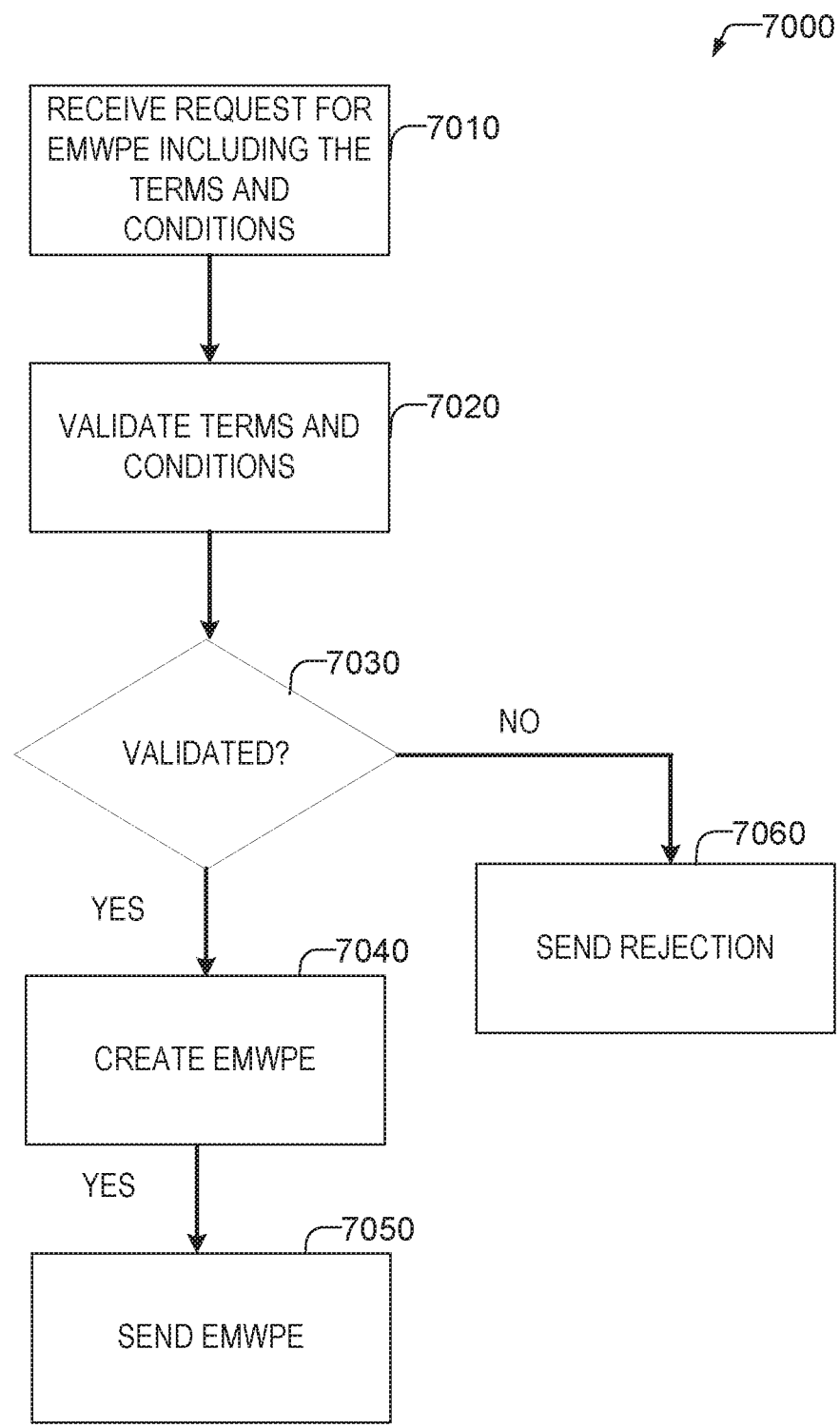
FIG. 7 shows a flowchart of a method of a mobile wallet issuer system issuing an EMWPE application according to some examples of the present disclosure.

FIG. 7 shows a flowchart of a method 7000 of a mobile wallet issuer system issuing an EMWPE application according to some examples of the present disclosure. At operation 7010 a request for an EMWPE including terms and conditions is received from the merchant. At operation 7020 in some examples the terms and conditions may be validated against various credit policies, available merchant credit, customer credit, merchant preferences, merchant restrictions, and the like. At operation 7030 a determination is made whether the terms and conditions are acceptable given the evaluation of operation 7020. If the terms and conditions are acceptable than an EMWPE is created at operation 7040 and sent at operation 7050. If the terms and conditions are not validated, then a rejection may be sent to the merchant at operation 7060.

EMWPE modules may be code modules, such as Java modules, JavaScript, .COM modules, .DLL modules, or other modules which may increase the functionality of the mobile wallet application. In other examples, the EMWPE modules may be web pages comprising one or more HyperText Markup Language (HTML) files, Content Style Sheets (CSS), JavaScript or other scripting files, and the like. In some examples, the mobile wallet application provides an environment for the EMWPE to execute. For example, the mobile wallet application may one or more of render the EMWPE, pass input to the EMWPE, interpret EMWPE commands into executable instructions, and provide the EMWPE with wallet-to-wallet communications capabilities. The EMWPE may have one or more resource files, such as the terms and conditions, account information, graphics, and the like. EMWPE files may be created by utilizing a template—such that a base EMWPE application may be customized by replacing one or more resource files with customized files (e.g., selecting which of a plurality of resource files to package together in a EMWPE application).

Figure 8:
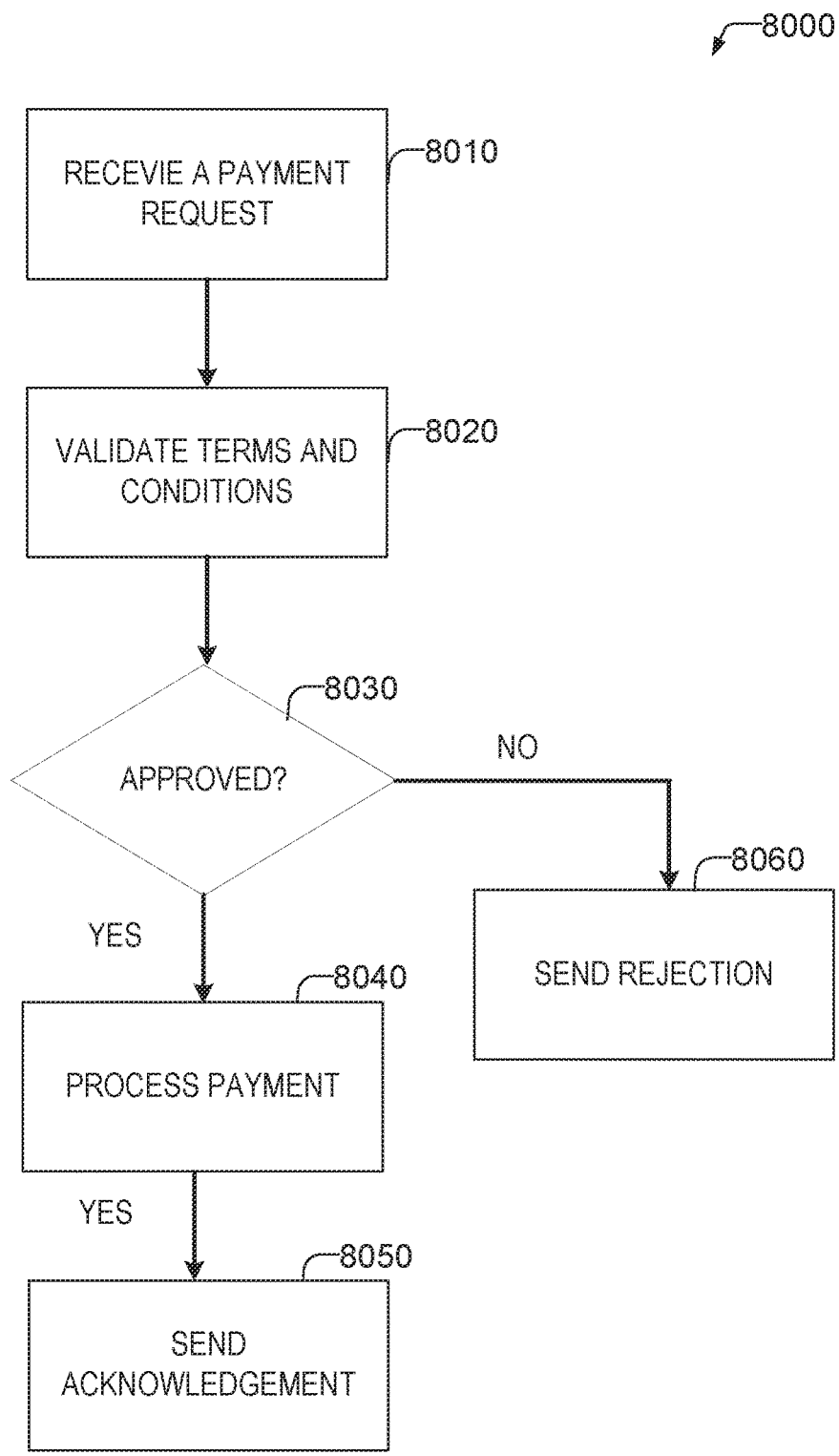
FIG. 8 is a flowchart of a method of processing a payment request at a mobile wallet issuer system according to some examples of the present disclosure.

FIG. 8 is a flowchart of a method 8000 of processing a payment request at a mobile wallet issuer system. At operation 8010, the payment request is received. At operation 8020 the payment information in the payment request is compared against the terms and conditions of the EMWPE that requested the payment. A determination is made at operation 8030, based upon the terms and conditions and the EMWPE whether the payment should be approved. If the payment should be approved, the payment may be processed at operation 8040 (e.g., payment messages are sent, accounts are credited or debited, or the like). At operation 8050 an acknowledgement is sent to the merchant. If the payment should be rejected, a rejection message is sent at operation 8060.

While a customer may select an EMWPE manually, in some examples, the EMWPE may execute from time to time automatically on the mobile device of the user. For example the EMWPE may execute at scheduled times. For example, if the terms and conditions specify a payment every month, the EMWPE may execute just prior to the due date to remind the customer to make the payment. The EMWPE may offer the user the opportunity to make a payment with another payment element. In this example, the EMWPE may contact the merchant's mobile wallet issuer system, or the mobile wallet's mobile wallet issuer system to make the payment. In some examples, the user may setup these payments to happen automatically. In these examples, the EMWPE may link the payment with another payment element.

In some examples, if a user decides not to accept the terms and conditions of the EMWPE, the user may defer the decision until later. In the meantime the user may purchase goods or services using another payment element. If the customer later determines that they wish to accept the terms and conditions, the user may transfer the payment balance from the payment element that was used to the EMWPE payment element. For example, the merchant's credit may be utilized to make the payment to the payment element of the user that was used to purchase the goods or services.

Figure 9:
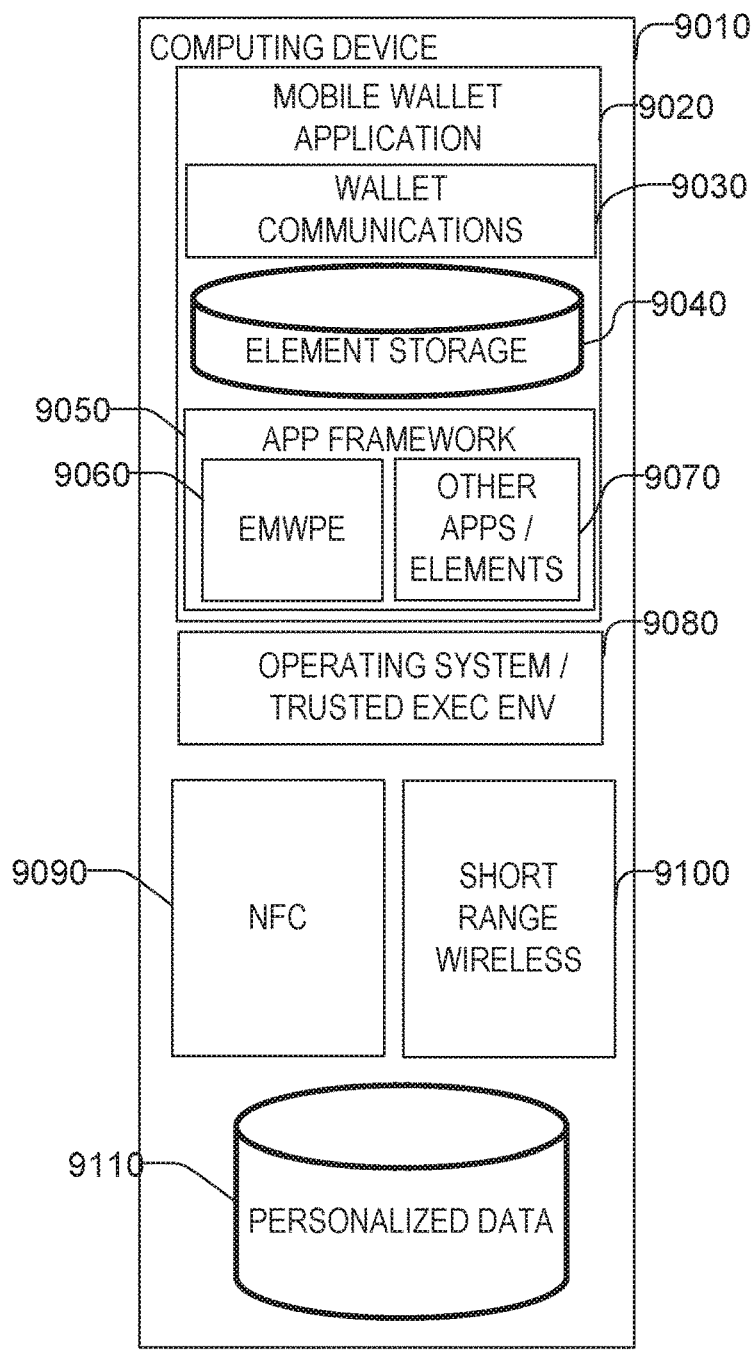
FIG. 9 shows an example of a computing device with a mobile wallet application according to some examples of the present disclosure.

FIG. 9 shows an example of a computing device 9010 with a mobile wallet application 9020 according to some examples of the present disclosure. The elements of FIG. 9 may be implemented in hardware, software, or a combination of hardware and software. The elements of FIG. 9 may be considered modules as described below. The specific element configuration as shown in FIG. 9 is exemplary and in other examples, other configurations of elements may be utilized. Mobile wallet application 9020 may have a wallet communications module 9030 which may communicate with other mobile wallets (either peer-to-peer or infrastructure), communicate with mobile wallet issuer systems, communicate with merchant point of sale (POS) systems (e.g., using NFC payments), and the like. Element storage 9040 may store one or more mobile wallet elements, encryption keys, receipts, payment information, user information, and the like. In some examples, the EMWPE applications are installed and execute within the mobile wallet application 9020 as stand-alone apps. In other examples, mobile wallet application 9020 may have a mobile wallet application framework 9050 which may assist in executing EMWPE applications. The framework may provide an application container for the execution of the EMWPE as previously described. As shown in FIG. 9, an EMWPE 9060 may operate inside this framework. In other examples, other applications and elements 9070 may also operate within this framework to provide additional functionality. In some examples, applications within the framework are selectable by a user in a GUI the same way that non mobile wallet application framework 9050 elements are selectable. In other examples, a special menu for these applications may be available to the user. The framework may provide one or more services for the EMWPE. For example, standard GUI elements or interfaces in order to simplify EMWPE. In some examples, the EMWPE does not contain instructions that are executable by the processor of the computing device 9010 and instead contain byte-code, scripts, markup language, or other instructions that are interpreted by the framework into executable instructions. The mobile wallet application framework 9050 may be a virtual machine (e.g., a Java virtual machine), a browser, or the like.

The mobile wallet application 9020 may execute on top of one or both of an operating system and a trusted execution environment 9080. The operating system may provide task scheduling, memory management, application programming interfaces to the hardware of the computing device 9010, interprocess and interprocess communications, and the like. The trusted execution environment may be an isolated execution environment provided by the processor or the operating system of the computing device 9010 that provides various additional security features such as isolated execution, application integrity checking, and confidentiality. Computing device 9010 may have a Near Field Communications network interface 9090 which may provide for NFC communications. Computing device 9010 may have a short range wireless network interface 9100 to provide other short range wireless connections such as a BLUETOOTH, BLUETOOTH LOW ENERGY, WIFI (e.g., 802.11), and others. Personalized data 9110 may store terms and conditions, payment information, receipts, and the like. Computing device 9010 may be a customer's computing device with a consumer wallet or a merchant computing device with a merchant wallet. In the case of a merchant computing device with a merchant wallet, the merchant wallet may have additional components to create EMWPE applications. For example, an EMWPE creation and provisioning component as described with reference to EMWPE creation and provisioning 10020 of FIG. 10. While the disclosure herein is described as being a transaction between a merchant and a consumer, it will be appreciated that both parties could be merchants and both parties could be consumers.

Figure 10:
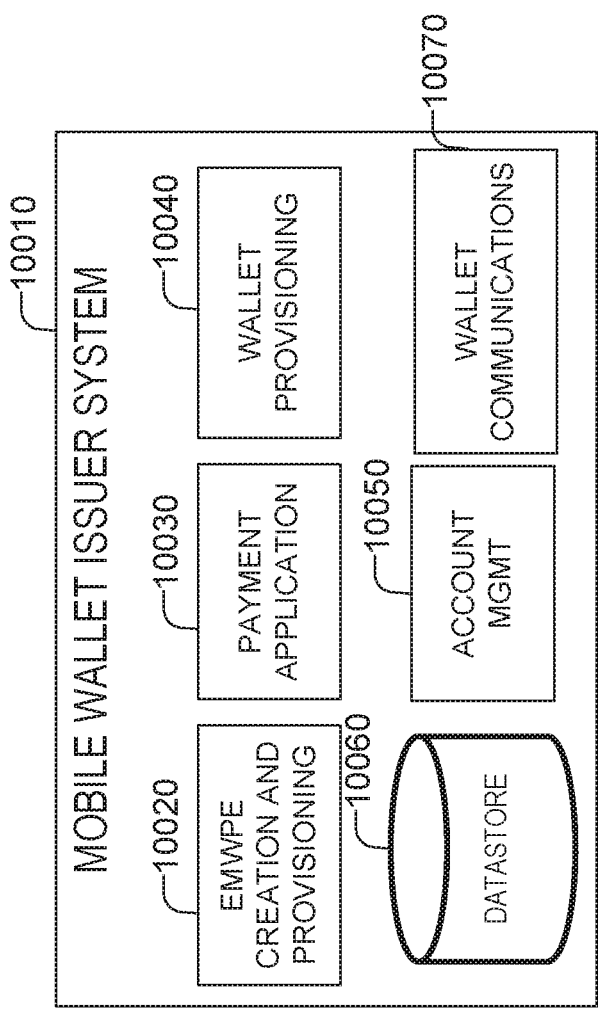
FIG. 10 shows an example of a mobile wallet issuer system according to some examples of the present disclosure.

FIG. 10 shows an example of a mobile wallet issuer system 10010 according to some examples of the present disclosure. The elements of FIG. 10 may be implemented in hardware, software, or a combination of hardware and software. The elements of FIG. 10 may be considered modules as described below. The specific element configuration as shown in FIG. 10 is exemplary and in other examples, other configurations of elements may be utilized.

Mobile wallet issuer system 10010 may include EMWPE creation and provisioning 10020 which may create EMWPE applications as previously described and provision them to merchant mobile wallet systems, or in other examples to consumer mobile wallet applications. Payment applications 10030 may determine if payments meet terms and conditions and are acceptable and if so, may process those payments. Wallet provisioning 10040 may provision payment elements or other elements of mobile wallets not provisioned by the EMWPE creation and provisioning 10020. Account management 10050 may track account balances and statuses which may be used by payment application 10030 in deciding whether to approve a transaction. Datastore 10060 may store merchant profiles which may include merchant preferences, merchant credit line information, merchant rules and restrictions, merchant assets (e.g., graphics for use in constructing EMWPEs) and the like. Datastore 10060 may store information used to generate EMWPE applications, such as templates, shells, assets (graphics), terms and conditions, and the like. Datastore 10060 may also store account information for both merchants and consumers, credit information, and other information used in making a decision approving or denying a EMWPE creation and payments. Wallet communications 10070 may provide one or more functions to communicate with one or more mobile wallets, either peer-to-peer or through an infrastructure.

Figure 11:
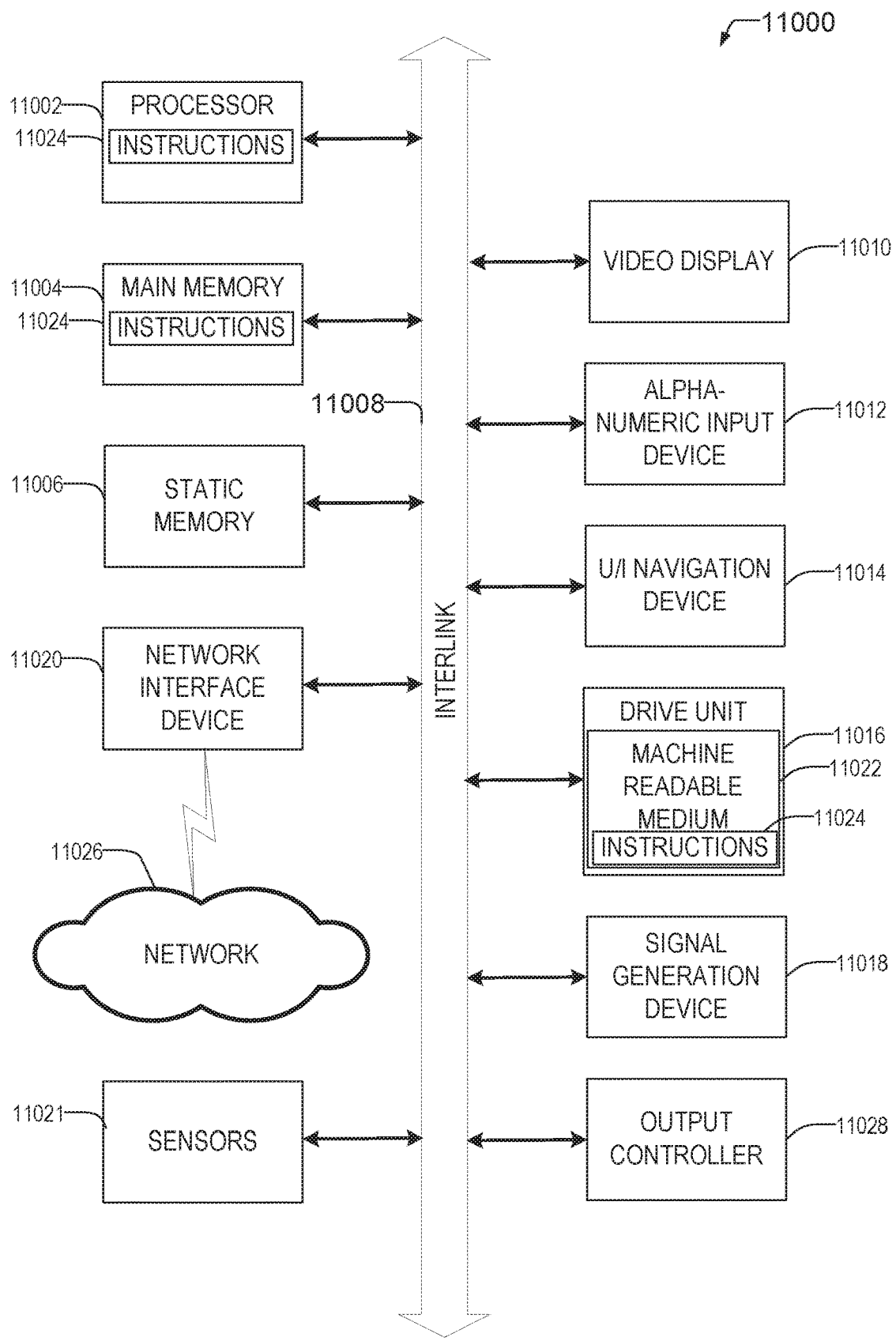
FIG. 11 is a block diagram illustrating an example of a machine upon which one or more embodiments may be implemented.

FIG. 11 illustrates a block diagram of an example machine 11000 upon which any one or more of the techniques (e.g., methodologies) discussed herein may perform. In alternative embodiments, the machine 11000 may operate as a standalone device or may be connected (e.g., networked) to other machines. In a networked deployment, the machine 11000 may operate in the capacity of a server machine, a client machine, or both in server-client network environments. In an example, the machine 11000 may act as a peer machine in peer-to-peer (P2P) (or other distributed) network environment. The machine 11000 may be a computing device, a mobile wallet issuer system, personal computer (PC), a tablet PC, a set-top box (STB), a personal digital assistant (PDA), a mobile telephone, a smart phone, a web appliance, a network router, switch or bridge, or any machine capable of executing instructions (sequential or otherwise) that specify actions to be taken by that machine. Machine 11000 may implement mobile wallet 1020, 1030, 2010, 2020, NFC reader 1040, merchant mobile wallet issuer system 1010, 2080, 10010, and computing device 9010. Machine 11000 may implement FIG. 2 and be configured to perform the methods of FIGS. 3-8. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate on, logic or a number of components, modules, or mechanisms. Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

Machine (e.g., computer system) 11000 may include a hardware processor 11002 (e.g., a central processing unit (CPU), a graphics processing unit (GPU), a hardware processor core, or any combination thereof), a main memory 11004 and a static memory 11006, some or all of which may communicate with each other via an interlink (e.g., bus) 11008. The machine 11000 may further include a display unit 11010, an alphanumeric input device 11012 (e.g., a keyboard), and a user interface (UI) navigation device 11014 (e.g., a mouse). In an example, the display unit 11010, input device 11012 and UI navigation device 11014 may be a touch screen display. The machine 11000 may additionally include a storage device (e.g., drive unit) 11016, a signal generation device 11018 (e.g., a speaker), a network interface device 11020, and one or more sensors 11021, such as a global positioning system (GPS) sensor, compass, accelerometer, or other sensor. The machine 11000 may include an output controller 11028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 11016 may include a machine readable medium 11022 on which is stored one or more sets of data structures or instructions 11024 (e.g., software) embodying or utilized by any one or more of the techniques or functions described herein. The instructions 11024 may also reside, completely or at least partially, within the main memory 11004, within static memory 11006, or within the hardware processor 11002 during execution thereof by the machine 11000. In an example, one or any combination of the hardware processor 11002, the main memory 11004, the static memory 11006, or the storage device 11016 may constitute machine readable media.

While the machine readable medium 11022 is illustrated as a single medium, the term "machine readable medium" may include a single medium or multiple media (e.g., a centralized or distributed database, and/or associated caches and servers) configured to store the one or more instructions 11024.

The term "machine readable medium" may include any medium that is capable of storing, encoding, or carrying instructions for execution by the machine 11000 and that cause the machine 11000 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 11024 may further be transmitted or received over a communications network 11026 using a transmission medium via the network interface device 11020. The Machine 11000 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 11020 may include one or more physical jacks (e.g., Ethernet, coaxial, or phone jacks) or one or more antennas to connect to the communications network 11026. In an example, the network interface device 11020 may include a plurality of antennas to wirelessly communicate using at least one of single-input multiple-output (SIMO) multiple-input multiple-output (MIMO), or multiple-input single-output (MISO) techniques. In some examples, the network interface device 11020 may wirelessly communicate using Multiple User MIMO techniques.

What is claimed is:

1. A method for obtaining credit for a transaction, the method comprising:
   using one or more processors executing a mobile wallet application to perform operations of:
   receiving, over a packet-based network, an enhanced mobile wallet payment element (EMWPE), the EMWPE comprising computer-executable instructions, an encrypted account code, data describing conditions for a store credit from a merchant, and digital logic that verifies use of the mobile wallet application according to the conditions;
   executing the instructions of the EMWPE in an application framework of the mobile wallet application, wherein the instructions of the EMWPE perform operations comprising:
   displaying the conditions for the store credit from the merchant on a display device coupled to the one or more processors;

receiving an indication that a user of the mobile wallet application approves of the conditions from an input device coupled to the one or more processors;

sending, over the network, an indication of the approval along with a digital signature signed by a private key of the mobile wallet application;

responsive to sending the indication of the approval, receiving, over the network, an account code unlocking encryption key; and unencrypting the encrypted account code by utilizing the unlocking encryption key, the account code for authorizing payment on the obtained credit;

receiving an indication that the user wishes to utilize the EMWPE for a transaction from the input device;

responsive to receiving the indication that the user wishes to utilize the EMWPE for the transaction, executing the digital logic to determine whether the transaction complies with the conditions, the conditions including a credit limit, the digital logic determining whether the transaction complies with the conditions based upon comparing a balance on the EMWPE with the credit limit;

responsive to determining that the transaction complies with the conditions, proceeding with the transaction, by sending a payment request over the network, using the account code in dependence on a result of the execution of the digital logic that verifies use of the mobile wallet application according to the conditions, the transaction comprising a loan on the store credit issued by the merchant; and subsequent to the transaction:

executing the EMWPE at a scheduled time;

determining that a repayment of the loan is due to be made in accordance with the conditions; and automatically making a payment to the merchant from another mobile wallet payment element of the user.

2. The method of claim 1, wherein the EMWPE is executed upon a user selection of the EMWPE in a Graphical User Interface (GUI) of the mobile wallet application.

3. The method of claim 1, wherein the EMWPE is received from a merchant mobile wallet application using a peer-to-peer mobile wallet to mobile wallet communication.

4. The method of claim 1, wherein the EMWPE is received from a merchant mobile wallet application using an infrastructure mobile wallet to mobile wallet communication method.

5. The method of claim 1, wherein the conditions restrict usage to transactions with the merchant, and wherein the EMWPE prohibits use of the store credit with other merchants.

6. The method of claim 1, wherein the store credit is backed by a financial account of the merchant.

7. A computing device for obtaining credit for a transaction, the computing device comprising:

one or more processors executing a mobile wallet application, the mobile wallet application including instructions for:

receiving, over a packet-based network, an enhanced mobile wallet payment element (EMWPE), the EMWPE comprising computer-executable instructions, an encrypted account code, data describing conditions for a store credit from a merchant, and digital logic that verifies use of the mobile wallet application according to the conditions;

executing on the one or more processors the instructions of the EMWPE in an application framework of the mobile wallet application, wherein the instructions of the EMWPE perform operations comprising:

displaying the conditions for the store credit from the merchant on a display coupled to the one or more processors;

receiving an indication that a user of the mobile wallet application approves of the conditions from an input device coupled to the one or more processors;

sending, over the network, an indication of the approval along with a digital signature signed by a private key of the mobile wallet application;

responsive to sending the indication of the approval, receiving, over the network, an account code unlocking encryption key;

unencrypting the encrypted account code by utilizing the unlocking encryption key, the account code for authorizing payment on the obtained credit;

receiving an indication that the user wishes to utilize the EMWPE for a transaction from the input device;

responsive to receiving the indication that the user wishes to utilize the EMWPE for the transaction, executing the digital logic to determine whether the transaction complies with the conditions, the conditions including a credit limit, the digital logic determining whether the transaction complies with the conditions based upon comparing a balance on the EMWPE with the credit limit;

responsive to determining that the transaction complies with the conditions, proceeding with the transaction, by sending a payment request over the network, using the account code in dependence on a result of the execution of the digital logic that verifies use of the mobile wallet application according to the conditions, the transaction comprising a loan on the store credit issued by the merchant; and subsequent to the transaction:

executing the EMWPE at a scheduled time;

determining that a repayment of the loan is due to be made in accordance with the conditions; and automatically making a payment to the merchant from another mobile wallet payment element of the user.

8. The computing device of claim 7, wherein the EMWPE is executed upon a user selection of the EMWPE in a Graphical User Interface (GUI) of the mobile wallet application.

9. The computing device of claim 7, wherein the EMWPE is received from a merchant mobile wallet application using a peer-to-peer mobile wallet to mobile wallet communication.

10. The computing device of claim 7, wherein the EMWPE is received from a merchant mobile wallet application using an infrastructure mobile wallet to mobile wallet communication method.

11. The computing device of claim 7, wherein the conditions restrict usage to transactions with the merchant, and wherein the EMWPE prohibits use of the store credit with other merchants.

12. The computing device of claim 7, wherein the store credit is backed by a financial account of the merchant.

13. A non-transitory machine-readable medium including instructions, which when performed by a machine, cause the machine to perform operations for obtaining credit for a transaction, the operations comprising:

executing a mobile wallet application, the mobile wallet application:

receiving, over a packet-based network, an enhanced mobile wallet payment element (EMWPE), the EMWPE comprising computer-executable instructions, an encrypted account code, data describing conditions for a store credit from a merchant, and digital logic that verifies use of the mobile wallet application according to the conditions;
executing the instructions of the EMWPE in an application framework of the mobile wallet application, wherein the instructions of the EMWPE perform operations comprising:
displaying the conditions for the store credit from the merchant on a display coupled to the machine;
receiving an indication that a user of the mobile wallet application approves of the conditions from an input device coupled to the machine;
sending, over the network, an indication of the approval along with a digital signature signed by a private key of the mobile wallet application;
responsive to sending the indication of the approval, receiving, over the network, an account code unlocking encryption key;
unencrypting the encrypted account code by utilizing the unlocking encryption key, the account code for authorizing payment on the obtained credit;
receiving an indication that the user wishes to utilize the EMWPE for a transaction from the input device;
responsive to receiving the indication that the user wishes to utilize the EMWPE for the transaction, executing the digital logic to determine whether the transaction complies with the conditions, the digital logic determining whether the transaction complies with the conditions based upon comparing a balance on the EMWPE with the credit limit;
responsive to determining that the transaction complies with the conditions proceeding with the transaction, by sending a payment request over the network, using the account code in dependence on a result of the execution of the digital logic that verifies use of the mobile wallet application according to the conditions, the transaction comprising a loan on the store credit issued by the merchant; and
subsequent to the transaction:
executing the EMWPE at a scheduled time;
determining that a repayment of the loan is due to be made in accordance with the conditions; and
automatically making a payment to the merchant from another mobile wallet payment element of the user.

14. The non-transitory machine-readable medium of claim 13, wherein the EMWPE is executed upon a user selection of the EMWPE in a Graphical User Interface (GUI) of the mobile wallet application.

15. The non-transitory machine-readable medium of claim 13, wherein the EMWPE is received from a merchant mobile wallet application using a peer-to-peer mobile wallet to mobile wallet communication.

16. The non-transitory machine-readable medium of claim 13, wherein the EMWPE is received from a merchant mobile wallet application using an infrastructure mobile wallet to mobile wallet communication method.

17. The non-transitory machine-readable medium of claim 13, wherein the conditions restrict usage to transactions with the merchant, and wherein the EMWPE prohibits use of the store credit with other merchants.

18. The non-transitory machine-readable medium of claim 13, wherein the store credit is backed by a financial account of the merchant.

* * * * *

UNITED STATES PATENT AND TRADEMARK OFFICE
CERTIFICATE OF CORRECTION

| | |
|---|---|
| PATENT NO. | : 11,250,422 B1 |
| APPLICATION NO. | : 15/394656 |
| DATED | : February 15, 2022 |
| INVENTOR(S) | : Hayes et al. |

It is certified that error appears in the above-identified patent and that said Letters Patent is hereby corrected as shown below:

In the Claims

In Column 15, Line 33, in Claim 13, after "conditions", insert --,--

Signed and Sealed this
Twenty-third Day of August, 2022

*Katherine Kelly Vidal*

Katherine Kelly Vidal
*Director of the United States Patent and Trademark Office*